United States Patent [19]

Miklas

[11] 4,013,198
[45] Mar. 22, 1977

[54] MEASURING DISPENSER
[75] Inventor: Frank C. Miklas, Allentown, Pa.
[73] Assignee: General Electric Company, Bridgeport, Conn.
[22] Filed: July 28, 1975
[21] Appl. No.: 599,409
[52] U.S. Cl. .............................. 222/438; 222/233
[51] Int. Cl.² ...................................... G01F 11/46
[58] Field of Search ......... 222/456, 303, 113, 297, 222/186, 231, 233, 243, 234, 304, 306, 367, 298–300, 307, 308, 438–440; 99/286, 296; 221/7, 8

[56] References Cited
UNITED STATES PATENTS

| 393,149 | 11/1888 | Gates | 221/8 X |
|---|---|---|---|
| 445,483 | 1/1891 | Warnock | 222/307 X |
| 920,656 | 5/1909 | Ross | 222/303 |
| 1,420,222 | 6/1922 | Schmidt | 222/308 X |
| 1,563,756 | 12/1925 | Liberman | 222/306 X |
| 2,111,875 | 3/1938 | Swanson | 222/231 |
| 2,123,318 | 7/1938 | Taylor | 222/231 |
| 2,176,222 | 10/1939 | McGowan | 221/107 |
| 2,584,726 | 2/1952 | McOmber | 222/306 |
| 3,327,615 | 6/1967 | Swan | 99/286 |
| 3,823,844 | 7/1974 | Linkemer | 221/7 X |

Primary Examiner—Stanley H. Tollberg
Assistant Examiner—Norman L. Stack, Jr.
Attorney, Agent, or Firm—Leonard J. Platt; George R. Powers; John F. Cullen

[57] ABSTRACT

A measuring dispenser wherein a generally cylindrical drum having a transverse wall is positioned at the bottom of a canister, and a forwardly extending longitudinally movable partition with a transverse rear wall is inserted within the drum so that variable volume measuring chambers are provided by longitudinally moving the partition within the cylindrical drum. A one-piece cylindrical adjuster is inserted within the drum and is provided with inclined slots for longitudinally adjusting the partition.

14 Claims, 9 Drawing Figures

MEASURING DISPENSER

BACKGROUND OF THE INVENTION

1. FIELD OF THE INVENTION

This invention relates to a measuring dispenser and, more particularly, to a ground coffee dispenser which is provided with a variable volume rotatable measuring and dispensing chamber.

2. DESCRIPTION OF THE PRIOR ART

Dipsensers of the type which may be used for dispensing measured amounts of coffee or other dry ingredients have included a canister with a rotatable dispenser positioned at a bottom opening of the canister. Such dispensing constructions have usually included a generally cylindrical drum along with a partition which is positioned within the drum for varying the size of the measuring chambers. Some of the prior art partitions include a wall which extends radially within the cylindrical drum so that the volume of the measuring chamber may be adjusted by varying the distance of the movable radial wall from a fixed radial wall. Other dispensers include a partition which is longitudinally movable within the drum for varying the size of the measuring chambers. With either arrangement, it is especially desirable that the partitions be readily formed so that the they may be economically manufactured. It is also very desirable to provide a partition that may be reliably operated over a long period of time without becoming clogged and without breaking.

My present invention is an improvement on the invention disclosed and claimed in the application of Richard N. Brown, Ser. No. 599,410, filed July 28, 1975, and assigned to the same assignee as the present invention, which invention was made by Richard N. Brown prior to my invention.

It is a primary object of my invention to provide an improved measuring dispenser which may be readily positioned on and removed from a ground coffee canister and which may be reliably operated over and over again.

It is a further object of my invention to provide a measuring dispenser having relatively few parts which may be readily manufactured at relatively low cost.

SUMMARY OF THE INVENTION

In accordance with one of the aspects of this invention, my improved measuring dispenser includes a canister having a bottom wall, and a generally cylindrical dispensing drum is supported for rotational movement on the canister by curved guides that are positioned at the bottom wall of the canister. The dispensing drum has an enlarged dispensing aperture that is formed in its cylindrical wall for cooperating with an enlarged opening that is provided in the bottom wall of the canister for dispensing a measured quantity of material. Dispensing chambers are provided between the cylindrical wall of the drum, a longitudinally fixed transverse wall that is formed with the drum, and an adjustable partition that is movable toward and away from the longitudinally fixed transverse wall to vary the volume of the dispensing chambers that are provided in the drum. The movable partition includes a generally longitudinal member having a width slightly less than the inside diameter of the cylindrical drum and a transverse partition wall formed at one end of the longitudinal member. The partition is inserted within the drum with the longitudinal member extending through a transverse slot that is formed in the transverse wall of the drum. An adjuster member is connected to the portion of the longitudinal member that extends through the slot in the transverse wall of the drum for moving the longitudinal member in order to move the transverse partition toward and away from the front transverse wall of the dispensing drum in order to vary the volume of the measuring chambers that are provided between the transverse walls.

With this unique construction, the transverse partition may be readily moved within the drum by simply pulling or pushing on the portion of the longitudinal member that extends through the slot in the transverse wall of the drum outside of the dispensing chambers.

Moreover, in accordance with a further aspect of my invention, a one-piece generally cylindrical adjuster member is all that is required for moving the longitudinal member of the partition. The adjuster member takes the form of a cylinder which is inserted within the forward portion of the dispensing drum and projects outwardly to a readily accessible position in front of the canister. Inclined slots are formed in a cylindrical wall of the adjuster for cooperation with tabs that may be integrally formed on the forwardly extending longitudinal member of the partition.

Accordingly, with my improved construction arrangement, relatively few parts are required for providing a variable dispensing chamber and only a single part is required for moving the longitudinal member and the rear transverse partition wall toward and away from a slotted front transverse wall of the dispensing drum. The cylindrical dispensing drum may be molded in one piece to include not only the longitudinally fixed transverse wall with its forward transverse slot for receiving the longitudinal member of the partition, but also a forwardly extending portion which includes an integrally formed knob for rotating the entire dispensing drum. The cylindrical adjuster member is inserted within the forwardly extending knob portion of the dispensing drum. Accordingly, a very reliable dispenser which may be readily manufactured with relatively few easily assembled parts has been achieved.

BRIEF DESCRIPTION OF THE DRAWING

Other objects and attendant advantages of the invention will be apparent from the following description taken in connection with the accompanying drawing in which.

DESCRIPTION OF THE PREFERRED EMBODIMENT

Figure 1:
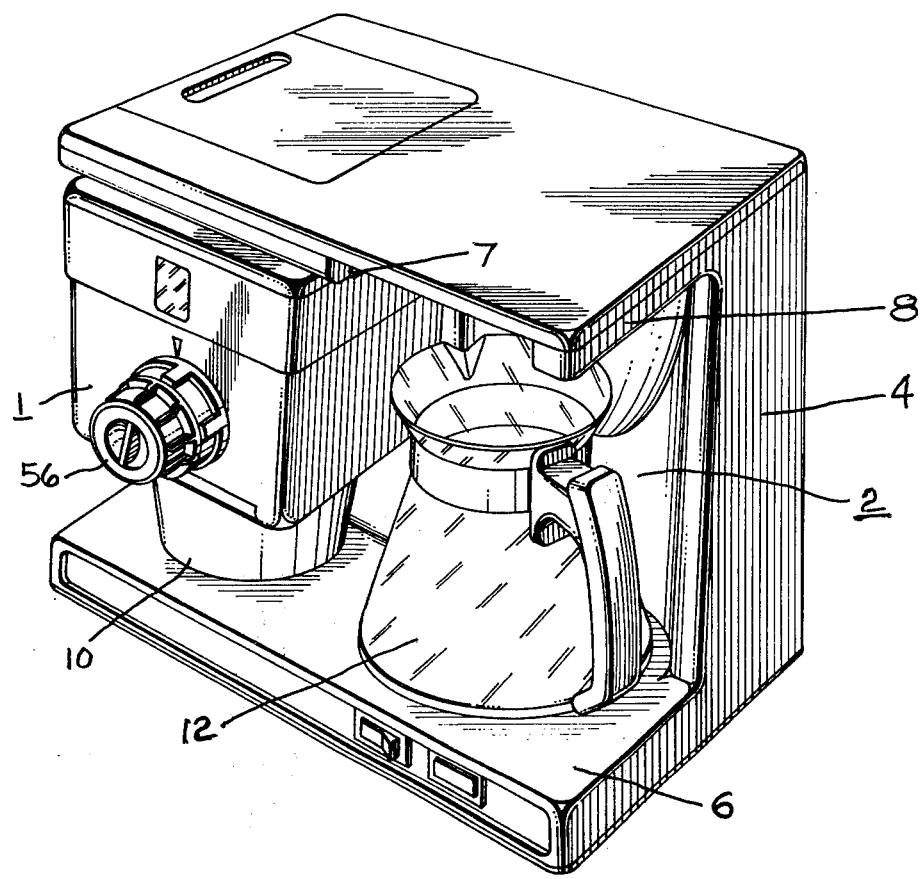
FIG. 1 is a front perspective view of an electric coffeemaker which includes a dispenser constructed in accordance with my invention.
Figure 2:
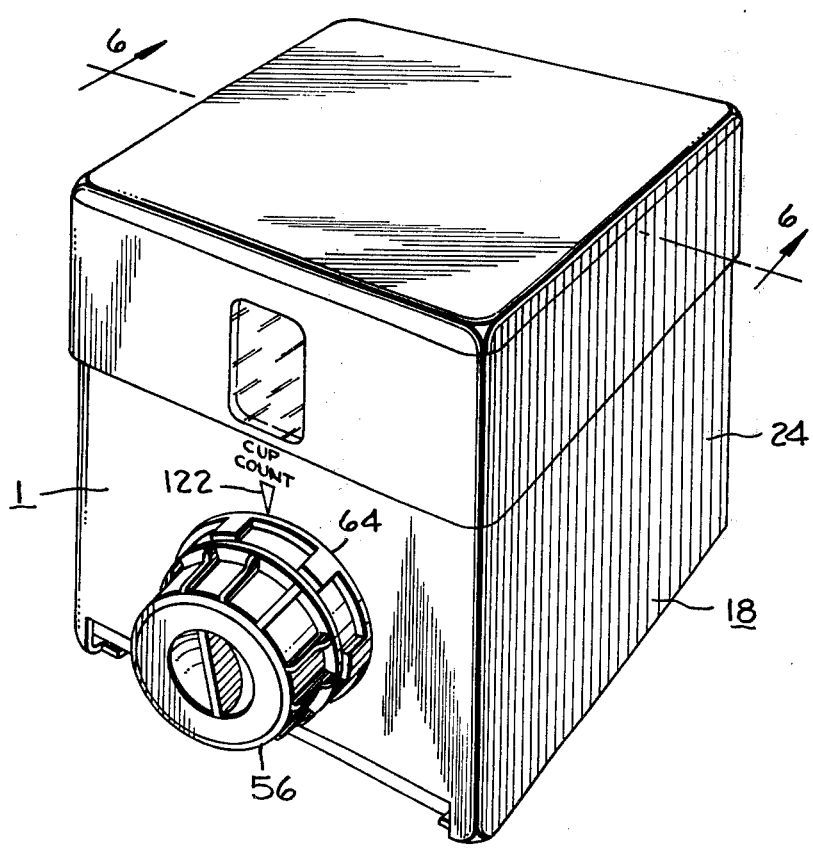
FIG. 2 is an enlarged front perspective view of the dispenser illustrated in FIG. 1.

Referring now to the drawing and first particularly to FIG. 1, there is shown an electric drip coffeemaker which includes my unique dispenser 1 for measuring and dispensing an infinitely variable quantity of dry ground coffee so that a desired brew strength is achieved by the electric coffeemaker. As shown, the coffeemaker includes a housing 2 having a generally vertical hollow rear wall 4, a hollow stand portion 6, and an overhanging wall 8. My improved ground coffee dispenser 1 is positioned at the left of the coffeemaker beneath the overhanging wall 8, and it may be operated to dispense dry ground coffee into a coffee basket 10. After the basket 10 has been filled with a desired amount of coffee, it may be slid outwardly from the dispenser and positioned on a support 7 that is provided in the overhanging wall 8. A carafe 12 is suitably supported on the stand 6 of the coffeemaker for receiving the brewed coffee from the coffee basket 10.

The overall construction of the electric coffeemaker including the housing 2, the carafe 12, the coffee basket 10 and the arrangement for supporting the coffee basket 10 on the dispenser 1 and the overhanging wall 8 of the coffeemaker do not form a part of this invention and are described and illustrated in greater detail in a co-pending application of Richard N. Brown, Ser. No. 599,411 now U.S. Pat. No. 3,968,740 issued July 13, 1976, assigned to the same assignee as the present invention.

MEASURING DISPENSER

In accordance with a preferred embodiment of this invention, my improved infinitely variable measuring dispenser may be constructed for measuring and dispensing just the right amount of ground coffee for brewing two, four, six, eight or 10 cups of coffee, and thus is includes a counting ring 64 for indicating a quantity of ground coffee for brewing two, four, six, eight or 10 cups of coffee. However, it should be understood that the dispenser could be used for dispensing other materials or ingredients such as sugar, flour or peanuts, for example.

Figure 3:
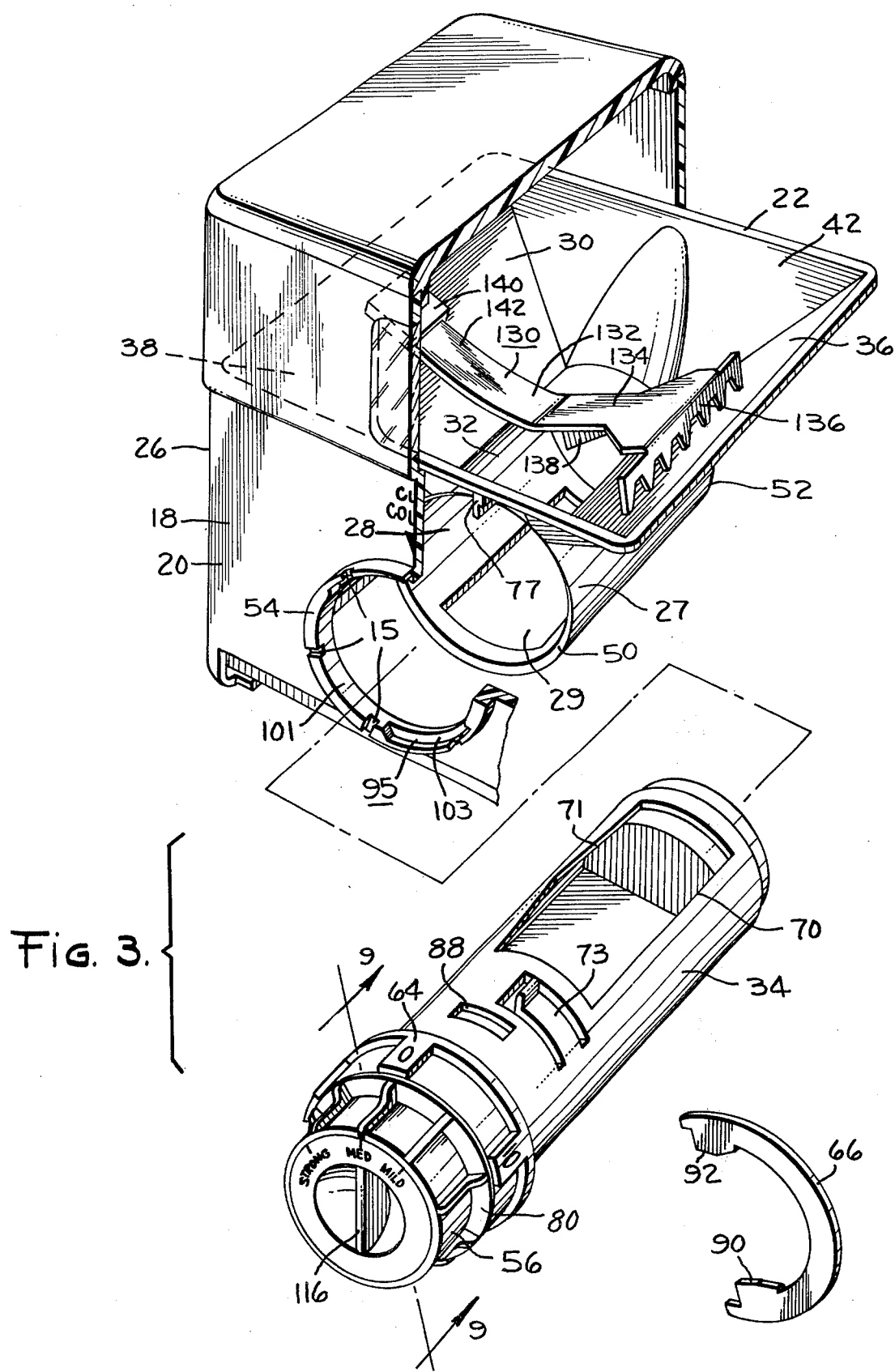
FIG. 3 is a perspective view of the dispenser shown in FIG. 2 with a dispensing drum removed from a canister and with portions broken away and other portions shown in section.

With particular reference to FIG. 3, it can be seen that the dispenser includes a canister 18 for holding ground coffee or other material. The canister has a front wall 20, a rear wall 22, side walls 24 and 26, and a sloped bottom wall 30 for guiding the ground coffee toward an enlarged aperture 32 that is provided adjacent to a dispensing drum 34. The sloped bottom wall includes a plurality of planar-shaped segments 36, 38, 40 and 42 which are inclined downwardly toward the enlarged opening 32. However, it is to be understood that the walls may be inclined in the form of a truncated cone or some other shape.

As shown in FIG. 3, the canister also includes a generally ring-shaped circular front guide 50, a rear guide 52 and a knob guide 54. Two curved guide walls 27 and 28 extend between the front and rear guide rings 50 and 52, the opening 32 which is formed in the inclined bottom wall 30, and a discharge opening 29 that is provided at the bottom of the guide rings 50 and 52. It can be seen that the front and rear guides 50 and 52 are positioned at the bottom wall 30 at the front and rear of the enlarged opening 32, and the circular guides 50 and 52 are arranged in line with each other so that they may readily receive the cylindrical drum 34. The circular knob guide ring 54 is formed or provided in the front wall 20 of the canister for holding and guiding a generally cylindrical dispenser knob 56 which is integrally formed with drum 34.

DISPENSING DRUM

Figure 4:
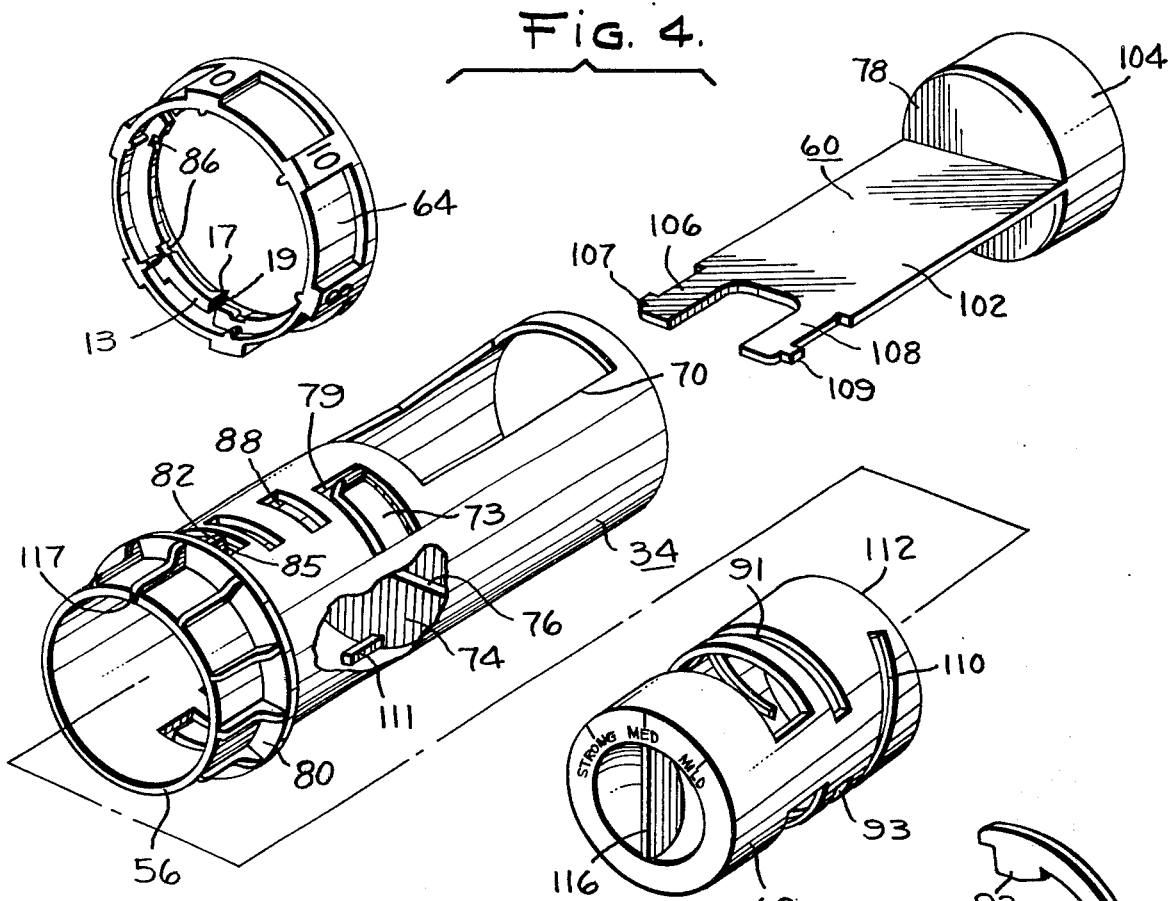
FIG. 4 is an exploded front perspective view of the dispensing drum, variable partition, adjuster, counting ring, and locking ring of the dispenser shown in FIG. 2.
Figure 5:
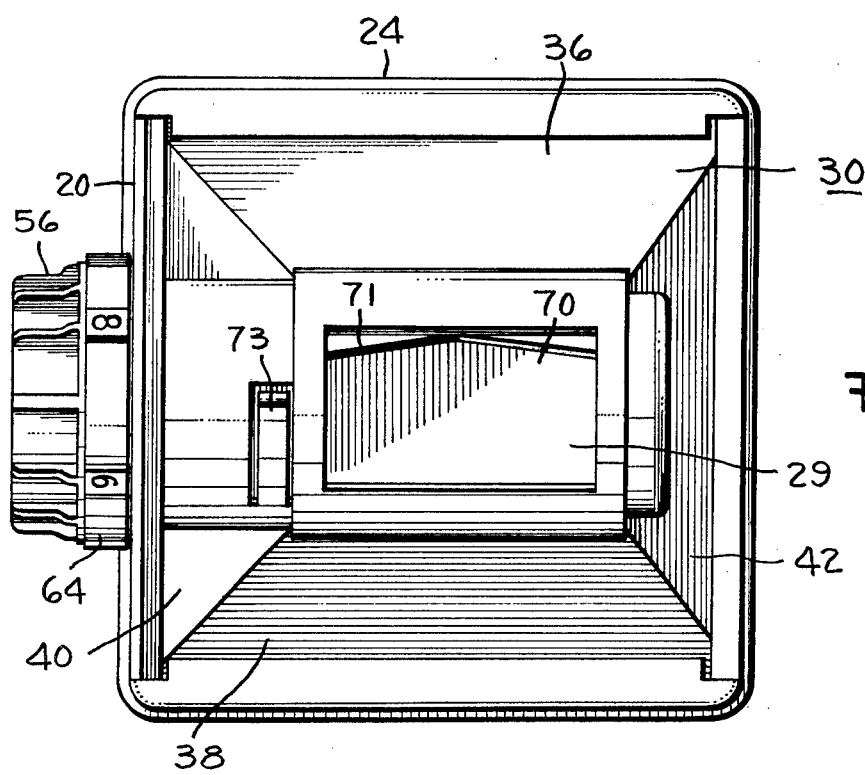
FIG. 5 is a bottom plan view of the dispenser shown in FIG. 2.

As shown more particularly in FIG. 4, my unique dispensing drum 34 is shaped and constructed so that it may perform a plurality of functions in its cooperation with a movable partition 60, a brew adjuster 62, a cup counting ring 64, a locking ring 66, and the enlarged aperture 32 which is formed in the bottom wall of the canister. The drum 34 is generally cylindrical in shape so that it may be readily inserted through the knob guide ring 54 and its front and rear supporting guides 50 and 52, respectively. It includes two enlarged apertures 70 and 72 in its side cylindrical wall of substantially the same size as the aperture 32 which is provided in the bottom wall of the canister for delivering a measured quantity of ground coffee or other material when either the aperture 70 or the aperture 72 is rotated in line with the aperture 29 that is provided in the generally cylindrical guide walls 27 and 28 and the guide rings 50 and 52.

The drum 34 is provided with a transverse wall 74 having a diametrical slot 76 formed therein for cooperation with the partition 60 including its transverse wall 78 and longitudinal plate 102 to provide a plurality of variable dispensing chambers in a manner to be more particularly described hereinafter.

The drum 34 also includes a knob 56 which may be integrally formed therewith so that the drum may be readily rotated in order to dispense a measured quantity of material. The drum knob 56 includes an integrally formed flange 80 for cooperating with the knob guide 54 of the canister. In addition, the drum 34 is also uniquely shaped to include a plurality of integrally formed pawl fingers 82 and 84 for cooperating with internal notches 86 that are provided on the counting ring 64 in order to count the measures of coffee or other material which is being dispensed by the measuring dispenser. Moreover, the one-piece drum 34 is also provided with a pair of slots 88 for cooperating with lugs 90 and 92 of the ring 66 to hold the cylindrical drum 34, the partition 60, the adjuster 62, and the counting ring 64 in assembled position on the canister. As shown more particularly in FIG. 4, the lugs 90 and 92 of the ring 66 pass through slots 91 and 93 of the brew partition adjuster 62 to longitudinally hold the adjuster 62 for rotational movement within the dispensing drum 34.

VARIABLE MEASURING PARTITION

With particular reference to FIG. 4, it can be apreciated that the variable measuring partition 60 has been uniquely designed and is incorporated with the dispensing drum 34 for achieving a reliable variable dispenser having very few parts. The partition itself may be integrally molded of a suitable thermoplastic material to include a transverse wall 100 and a generally rectangular plate 102 for dividing the cavity within the drum 34 and between the transverse drum wall 74 and the transverse partition wall 78 into two variable dispensing chambers. As shown, the generally rectangular longitudinal plate 102 of the partition has a width which is slightly less than the inside diameter of the drum 34, and the transverse wall 78 of the partition has a diameter which is slightly less than the inside diameter of the drum 34. The transverse partition wall 78 is arranged generally perpendicular to the longitudinal plate 102 and it can be seen that the partition includes a short cylindrical wall 104 for forming an inverted cup-like portion to suitably guide the transverse wall 74 when it is positioned in front of the rear edge of openings 70 and 72. It can also be seen in the upper portion of FIG. 4 that the partition includes two forwardly extending arms 106 and 108 which may be inserted through the diametrical slot 76 in the transverse wall 74 of the drum for sliding the partition within the drum in order to vary the volume of the measuring chambers that are provided on opposite sides of the longitudinal wall 102.

In accordance with my invention, the one-piece rotatable adjuster 62 is uniquely incorporated with the partition 60 and the drum 34 for moving the partition 60 forwardly and rearwardly within the drum. As shown at the lower portion of FIG. 4, the rotatable adjuster 62 is generally cylindrical in shape and is provided with a plurality of inclined slots 110 that extend through the cylindrical wall of the adjuster for cooperating with outwardly extending lug portions 107 and 109 of the arms 106 and 108 of the partition to move the partition 60.

In order to assemble the partition 60 and the rotatable brew adjuster 62 to the drum 34, the rotatable adjuster 62 is slid into the left end portion of the drum 34 until its right portion 112 abuts the inward projections 111 that may be integrally formed with drum 34. Then, the partition 60 is inserted within the right rear portion of the drum 34 and the arms 106 and 108 and the left front portion of the plate 102 are passed through the diametrical slot 76 that is formed in the transverse wall 74. Since the parts are preferably formed of a thermoplastic material, the lug portions 107 and 109 may be readily inserted within the slots 110 by squeezing the open end portion of the adjuster 62 slightly out of round to admit the lugs into the slots. Thus, with this unique construction, the partition is pushed into the drum until the lug portions 107 and 109 snap into one of the screw slots 110 that are provided in the rotatable adjuster.

With the parts in their assembled position, a finger grip tab 116 that may be integrally provided in an outside transverse end wall 118 of the adjuster 62 may be rotated with respect to the cylindrical dispensing drum 34 in order to move the transverse wall 78 of the partition toward and away from the transverse wall 74 of the dispensing drum in order to vary the volume of the dispensing chambers. This is reliably since rotation sincerotation of the adjuster 62 will cause the lugs 107 and 109 to slide on the side surfaces of slots 110 to pull the rear transverse wall 78 closer to the front transverse wall 74 or, when rotated in a clockwise direction as viewed in FIG. 4, it can be appreciated that the adjuster 62 will cause the rear transverse wall 78 to be moved away from the front transverse wall 74 to increase the size of the dispensing chambers that are formed on opposite sides of the plate 102.

A relatively simple arrangement including relatively few parts is also provided for holding the dispensing drum 34 including its previously assembled partition 60 and brew adjuster 62 in the canister 18. In order to assemble these parts to each other, the counting ring 64 is first placed over the dispensing drum 34 until it abuts the outwardly extending flange 80 of the knob 56. Then the left end of the drum 34 is inserted through the knob guide ring 54, through front guide 50, and through rear guide 52 until the left portion of the counting ring abuts the front surface of the front canister wall 20. The assembly is locked into longitudinal position by then simply placing the C retainer ring 66 over the dispensing drum 34 in the vicinity of slots 88 until the lugs 90 and 92 of the retainer ring snap through the slots 88 of the dispenser drum 34 and slots 91 and 93 of the brew and partition adjuster 62 to hold all of the parts on the canister 18. Moreover, the lugs 90 and 92 of the retainer ring extend into 120° slots 91 that are provided in the cylindrical wall of the adjuster 62 in order to limit the range of rotation of the brew adjuster 62 in the drum 34.

It is desired that my improved infinitely variable measuring dispenser be constructed for measuring and dispensing just the right amount of dry ground coffee for brewing two, four, six, eight or 10 cups of coffee. It can be appreciated that the dispenser drum 34 includes two variable measuring chambers that are positioned on opposite sides of the longitudinal plate 102 and the overall size of the chambers has been determined so that each chamber holds approximately three tablespoons of coffee, which is the amount of coffee normally required for making two cups of coffee. The unique integrally formed slots 110 of the brew adjuster 62 that are arranged for cooperation with the outwardly extending lugs 107 and 109 of the partition 60 enable the partition 60 to be readily and reliably moved to and fro within the dispensing drum 34. As shown in FIG. 4, this can be achieved by simply gripping a tab 116 that is formed on the brew adjuster 62 in order to rotate the indicators STR, MED, or MILD with respect to an indicator mark 117 that may be provided by one of the gripper protrusions of knob 56. Rotation of the brew adjuster 62 in a clockwise direction with respect to the drum knob 56 from a MILD to a STR position will cause the lugs 107 and 109 to smoothly slide on the surfaces of the inclined slots 110 to move the partition 60 and particularly its rear transverse wall 78 rearwardly away from the front transverse wall 74 of the dispensing drum in order to increase the size of the dispensing chambers. Correspondingly, rotation of the inner brew adjuster member 62 in a counterclockwise direction with respect to the knob 56 from a STR position to a MILD position will cause the lugs 107 and 109 to be pulled forwardly within the drum 34 in order to decrease the size of the dispensing chambers.

With this construction, it can be appreciated that the approximate three tablespoon size of each of the measuring chambers can be accurately varied from approximately 3¼ standard tablespoons to approximately 2½ standard tablespoons and the desired approximate three tablespoons volume could remain set in the variable dispenser by simply not touching the inner brew adjuster tab 116. In this manner, the brew setting of the variable dispenser for determining the strength of the brew could remain set so that day after day just the right amount of dry coffee would be dispensed according to the taste preference of the person making the coffee.

Figure 9:
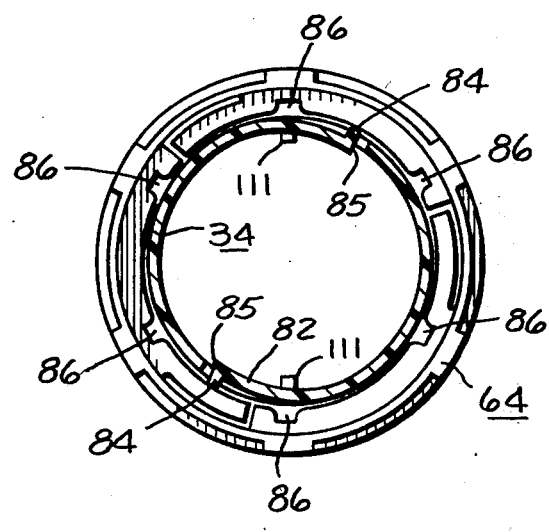
FIG. 9 is a cross-sectional view of the dispenser drum and cup counting ring taken on the plane of 9—9 of FIG. 3.

A mechanism is provided for counting the number of two-cup volumes that are dispensed with each half rotation of the dispensing drum 34. This is achieved by the cup counting ring 64 and its cooperation with its driving spring fingers 82 and 84 and a cam surface 95 that is formed on the inner circumferential surface of the knob guide ring 54. The counting ring has six indicia for indicating 0, 2, 4, 6, 8 or 10 cups of coffee, and it can be appreciated that the dispenser drum 34 is rotated ½ revolution for dispensing one chamberful of a quantity of dry coffee for making two cups of coffee. Thus, the counting ring 64 is designed to be rotated one-sixth of a rotation for each half rotation of the dispensing drum. As shown in FIG. 9, two diametrical driving fingers 82 and 84 are provided on the dispenser knob for selectively engaging the six notches 86 that are provided on the inside surface of the counting ring. Since it is desired to rotate the counting ring one-sixth of a rotation for each half rotation of the dispenser and its dispenser knob 56, the cam surfaces 95 that are provided on the inside of the knob guide ring 54 having been designed to hold the driving fingers 82 and 84 out of engagement with the notches 86 during approximately two-thirds of each half rotation of the dispenser knob 56. Thus, as shown more particularly in FIG. 3, the cam surface 95 includes two radially inwardly directed raised cam surfaces 101 that extend approximately 120° and two oppositely disposed outer cam surfaces 103 that extend for approximately 60°. Thus, during the first 120° rotation of each dispensing movement of the dispenser knob 56, the spring fingers 82 and 84 will be held on the radially inwardly directed cam surfaces 101 and will be prevented from moving outwardly far enough to engage any of the notches 86. However, during the last 60° of each 180° dispenser knob rotation, the spring fingers 82 and 84 will move from the radial inner surface 101 to the radial outer surface 103 and in that position each of the spring fingers 82 and 84 will move into the next notch 86 to rotate the counting ring one-sixth of a rotation. Thus, for example, the counting ring would be moved from its 4-cup indicator until the 6-cup indicator appears opposite the cup marker 122.

In order to ensure that the dispensing drum 34 will only be rotated in a clockwise direction, a pair of spring fingers 73 are provided rearwardly from slots 88 and in front of the integrally formed partition wall 74 for cooperating with a downwardly extending tab 77 that may be integrally formed with the bottom wall 32 and the front guide 50. The fingers 73 extend in a counterclockwise direction from their integral connection with the drum 34 toward an abrupt pawl surface 79. With this construction, when the drum 34 is inserted within the canister and rotated in a clockwise direction, the fingers 73 will freely slide on and ratchet past the tab 77. However, should the drum 34 be rotated in a counterclockwise direction, the abrupt generally perpendicular surfaces of the fingers 73 will engage the downwardly extending tab 77 to preclude counterclockwise rotation of the drum 34 within the canister.

In accordance with my invention, a mechanism is provided for permitting the cup counting ring 64 to be rotated only in a clockwise direction for indexing the ring to zero without causing corresponding rotation of the dispensing drum 34 or its knob 56 or the brew strength adjuster member 62. In order to achieve this, as shown in FIGS. 3 and 4, a plurality of rearwardly extending integrally formed spring pawls 13 are provided on the inside of the counting ring 64 for cooperation with a plurality of notches 15 in the longitudinal outer surface of the knob guide ring 54. It can be seen that all of the spring fingers 13 extend in a counterclockwise direction from their integral connection with the counting ring 64, each of the spring fingers 13 has an inclined surface 17 at its free end portion which extends longitudinally toward the knob guide 54, and each of the spring fingers 13 has an abrupt free end pawl surface 19 for engagement with the counterclockwise side surface of each of the notches 15 when an attempt is made to rotate the counting ring 64 in a counterclockwise direction. Thus, when the counting ring 64 is rotated in a clockwise direction, the inclined surfaces 17 will snap into each of the notches 15 as the counting ring 64 slides on the knob guide 54, and continued rotation will cause the inclined surfaces 17 to ride upwardly on the clockwise edge surfaces adjacent to the notches 15 to move the fingers longitudinally forwardly to permit continued rotation of the counting ring in a clockwise direction. Naturally, any attempt to rotate the counting ring in a counterclockwise direction will simple cause the abrupt surfaces 19 of the spring fingers to move into engagement with the generally perpendicular counterclockwise surfaces of the notches 15.

In accordance with my invention, the spring fingers 13 and the notches 15 are also designed to produce an audible click when each cup number on the cup counting ring 64 passes under the CUP COUNT marker on the canister. Thus, six notches 15 are provided in the knob guide 54 for cooperating with three symmetrically arranged spring fingers 13. Moreover, the relative circumferential location of each of the notches 15 to the spring fingers 13 and the cup numbers that are provided on the outer periphery of the counting ring 64 is such that the pawl surface 17 of the spring fingers will be located within one of the six notches 15 whenever one of the cup count numbers is located below the CUP COUNT marker 122.

Figure 6:
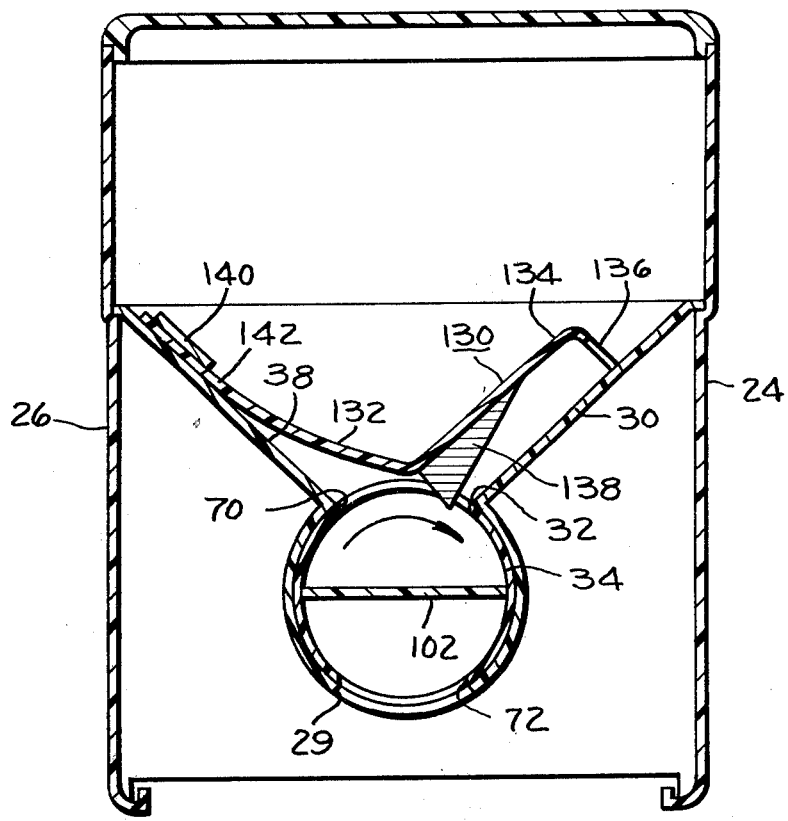
FIG. 6 is a cross-sectional view of the dispenser taken substantially on the plane of 6—6 of FIG. 2 showing the dispenser drum and an agitator, the parts being shown in a position wherein a cylindrical wall of the dispenser has released the agitator and the agitator has struck a bottom wall of the canister.
Figure 7:
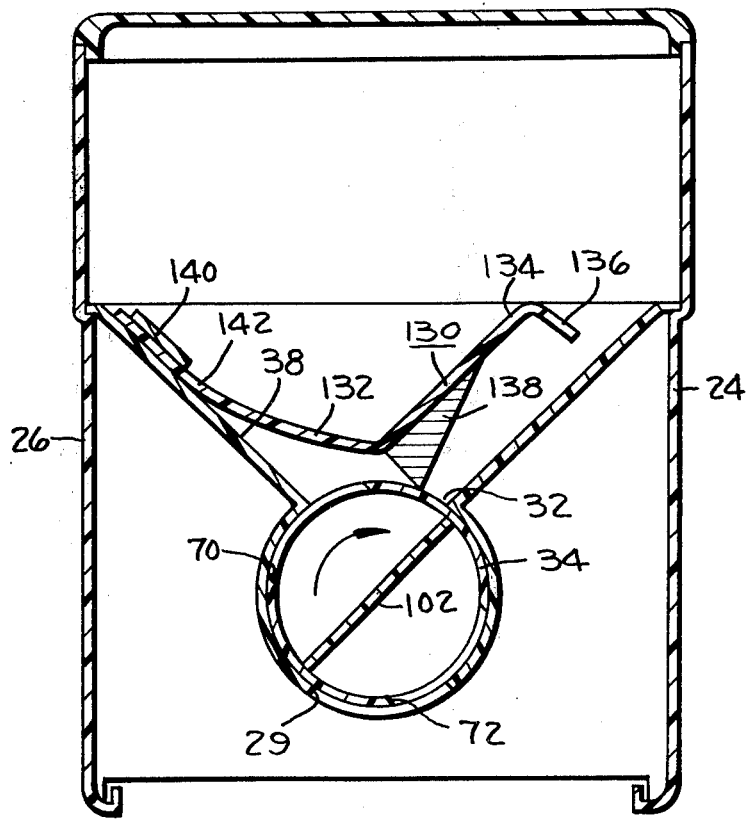
FIG. 7 is a cross-sectional view of the dispenser also taken on the plane of 6—6 of FIG. 2 showing the dispenser drum and an agitator, the parts being shown in a position where an upper dispensing chamber is being filled while a lower chamber is being emptied and the cylindrical wall of the dispenser is holding the agitator above the bottom wall of the canister.
Figure 8:
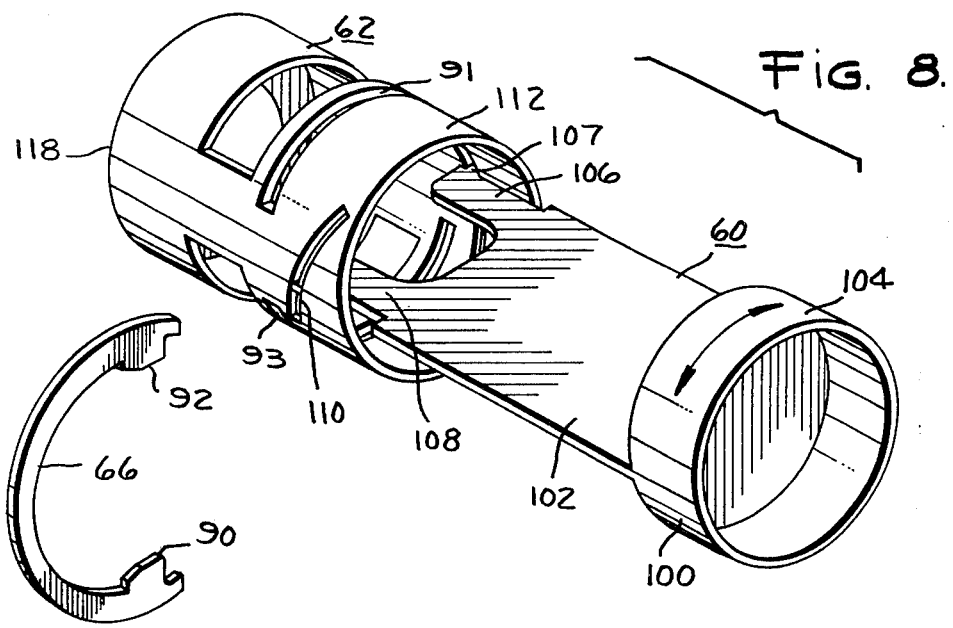
FIG. 8 is an exploded rear perspective view of the partition, adjuster and locking ring.

In accordance with my invention, a more positive and larger agitator is provided for loosening the grounds in the canister as the dispensing drum 34 is rotated by manual rotation of its knob 56. As shown more particularly in FIGS. 3, 6 and 7, this is achieved by a generally L-shaped rake 130. As shown, the rake includes an elongated arm 132, a shorter integrally formed arm 134 that extends generally perpendicular to the elongated arm 132, and a rake 136 which is integrally formed at the free end of the shorter arm 134. The rake also includes a finger 138 that extends downwardly from the shorter arm and into the opening 32 that is provided at the bottom wall 30 of the dispenser where it is in a position to be moved upwardly by the cylindrical portion of the drum 34 in the vicinity of enlarged openings 70 and 72 as the trailing edges of openings 70 and 72 pass under finger 138.

The agitator 130 including its elongated arm 132, its shorter arm 134, rake 136 and finger 138 is preferably integrally molded from a suitable plastic material and may be readily connected to the downwardly extending left segment 38 of the bottom wall 30 by means of a slotted connector 140 that may be integrally formed in the left segment 38 of the bottom wall of the canister. In order to assemble the agitator to the slotted connector, it is merely necessary to position the finger 138 through the opening 32 and one of the openings 70 or 72 and push an end portion 142 of the agitator arm 132 into the slot 140 that is provided in the left segment 38 of the bottom wall 30 of the canister.

The openings 70 and 72 of the dispensing drum 34 are shaped for cooperation with the downwardly extending finger 138 of the agitator. As the drum 34 is rotated, the finger 138 will ride on the trailing edge surface 71 of each of the openings 70 and 72 and be lifted upwardly to the position illustrated in FIG. 7 where it will ride on the outside surface of the drum between the openings until it reaches the abrupt leading surface of one of the openings when it will snap downwardly to cause the rake portion 136 of the agitator to snap against the right bottom portion of the canister to agitate the coffee grounds within the dispenser and cause them to flow downwardly to and through the enlarged opening 132 and into one of the dispensing chambers.

OPERATION

The dispenser may be readily operated by simply inserting a quantity of ground coffee or other material through a top opening 120 of the canister and then adjusting the dispenser to dispense the desired quantity of coffee or other material. First, it may be desired to adjust the volume of the dispensing chambers that are provided between the transverse walls 78 and 74 and, in order to achieve this, the grip tab 116 is rotated within the knob 56 to select a STRONG, MED or MILD brew or any position between the indicators by moving the indicia on the brew adjuster 62 with respect to the indicator 117 on the brew knob 56. This sets the quantity that it is desired to dispense during each half rotation of the dispensing knob.

Then the CUP COUNT ring 64 may be rotated in a clockwise direction with respect to the dispensing knob 56 until the indicator 0 appears below the cup count marker 122. It should be appreciated that the integrally formed spring fingers 82 and 84 of the dispensing drum 34 extend in a clockwise direction from their integral connection with the drum to abrupt surfaces 85 which may be generally perpendicular to and extend beyond the cylindrical surface of the drum 34 at the free side of the fingers and that the trailing side of the fingers are rounded at 87. Thus, the ring 64 may be rotated freely in a clockwise direction with respect to the knob 56 since the slots 86 in the cup count ring 64 will slide over the rounded detail 87 on the trailing side of the fingers 82 and 84. However, when the ring is rotated in a counterclockwise direction with respect to the knob, the abrupt perpendicular surfaces 85 of the fingers 84 will move into the notches 86 that are formed on the inside surface of the counting ring. Moreover, the counting ring 64 may only be rotated in a clockwise direction with respect to the knob guide 54 in view of the integrally formed spring fingers 13 that are integrally formed on the inside of the counting ring 64 as shown in FIG. 4.

If, for example, it is desired to dispense a quantity of ground coffee for making six cups of coffee, the counting ring is rotated clockwise until the numeral 0 appears directly below the vertical indicia line 122 that may be provided on the front wall 20 of the canister. Then the knob 56 is grasped and rotated in a clockwise direction to rotate the dispensing drum 34 and its partition 60. When the drum is rotated two-thirds of a dispensing increment or 120°, spring fingers 82 and 84 will move into engagement with the notches 86 to rotate the counting ring one increment to its 2-cup position during the remaining one-third of the dispensing increment.

During the first 180° of rotation, one of the enlarged openings 70 or 72 will be placed in line with the enlarged opening 29 that is provided at the bottom of the dispenser and the quantity of ground coffee within one of the chambers will be dispensed into the coffee basket 10 that may be positioned below the dispenser 1. Continued rotation of the dispensing drum in a clockwise direction will successively dispense three volumes of coffee until the numeral 6 appears below the line 122. While one of the chambers is being refilled, the chamber on the other side of the dispenser will be discharging ground coffee through opening 29 and into the coffee basket 10 as the counting ring 64 moves from one CUP COUNT position to its next succeeding CUP COUNT position.

From the foregoing discussion, it will be appreciated that my improved measuring dispenser may be readily formed with relatively few parts. The principal component is a uniquely formed drum 34 which includes integrally provided dispensing openings, a slotted front transverse wall, an intregal knob 56, a locating flange 80, spring fingers 82 and 84 for cooperating with a counting ring 64, and slots 88 for cooperating with a locking ring 66. The remaining parts of the assembly include merely the partition 60, a one-piece rotatable adjuster 62, a counting ring 64 and the split ring 66 for holding everything assembled on the canister. Thus, the entire measuring dispenser is achieved with only six parts including the canister itself and the locking ring 66. Only three parts—a drum 34, a partition 60, and a rotatable adjuster 62—are required for the dispenser itself. In addition, the parts have been uniquely shaped so that no fastening means beyond the locking ring is required for holding the parts to each other.

Moreover, with my unique indexing dispenser, it can be appreciated that relatively little surface area is moved with respect to other surface area to achieve a dispenser which is relatively free from clogging by material entering spaces between moving parts. Only the edge surfaces of the plate 102 move with respect to the inner cylindrical wall of the drum 34, and only the edge surfaces of the diametrical slot 76 move with respect to the side surfaces of plate 102. The only interengaging cylindrical surfaces are those that are provided between the relatively narrow cup-shaped cylinder 104 and the inside cylindrical surfaces of the drum 34 in the vicinity of the cylindrical wall 104. However, the cylindrical wall 104 is relatively small and it is located between the end of the drum and the enlarged dispenser openings 70 and 72. Thus, there is little opportunity for ground coffee or other material to become wedged between the cylinder 104 and the inside cylindrical wall of the drum 34.

In addition, a one-piece brew adjuster 62 is provided for insertion within the knob portion of the drum for adjusting the partition 60 with the use of inclined slots 110 that are integrally provided within the one-piece adjuster member 62. Accordingly, a reliable dispenser which may be readily manufactured with very few easily assembled parts has been achieved.

What I claim is:

1. A measuring dispenser comprising:
   a. a canister having bottom wall means;
   b. a first curved guide positioned at said bottom wall means;
   c. a second curved guide positioned at said bottom wall means in line with the first curved guide;
   d. an enlarged opening provided in the bottom wall means of said canister between the first and second curved guides;
   e. a rotatable dispensing drum having a generally transverse wall and an enclosing side wall, said dispensing drum being positioned for rotational movement within said curved guides;
   f. an enlarged dispensing aperture formed in the enclosing side wall of said drum for cooperation with the enlarged opening formed in said bottom wall means;
   g. a slot provided in the generally transverse wall of said dispensing drum;
   h. a partition for separating said drum into variable measuring chambers, the partition including a generally longitudinal member having a width slightly less than the inside diameter of said generally cylindrical drum and a generally transverse wall formed at one end of said partition, said partition being inserted within said drum with the longitudinal member extending through the slot in the transverse wall of the drum whereby variable measuring chambers are formed between the transverse wall of the drum and the transverse partition wall; and
   i. means connected to the portion of the longitudinal member that extends through the slot in the transverse wall of the drum for moving the transverse partition wall toward and away from the transverse wall of the dispensing drum whereby to vary the volume of the measuring chambers that are provided between the transverse walls.

2. A measuring dispenser as defined in claim 1 wherein the means for moving the transverse partition wall toward and away from the transverse wall of the drum comprises:
   a. a one-piece generally cylindrical rotational adjuster having an inclined thread formed therein coupled to the longitudinal member; and
   b. said cylindrical adjuster including means extending outwardly from said canister for permitting manual rotation thereof in order to longitudinally move said longitudinal member and said transverse partition wall toward and away from the transverse wall of said drum in order to vary the volume of the dispensing chambers formed by said drum and said partition.

3. A measuring dispenser as defined in claim 2 wherein the inclined thread of said adjuster is a slot formed in a cylindrical wall of the adjuster for cooperation with arms that are formed on said longitudinal member.

4. A measuring dispenser as defined in claim 1 wherein said measuring dispenser further includes:
   a. a rotatable knob integrally formed with said drum for rotating said cylindrical dispensing drum; and
   b. a counting ring positioned between said knob and the wall of the canister for counting the number of volumes that have been dispensed, said counting ring including a plurality of spring pawls for permitting the counting ring to be rotated only in one direction.

5. A measuring dispenser as defined in claim 4 wherein said measuring dispenser further includes:
   a. a plurality of spring fingers integrally formed in the cylindrical wall of said dispensing drum arranged for cooperation with a plurality of radially extending notches formed in said counting ring for rotating the counting when the knob is rotated in said one direction.

6. A measuring dispenser as defined in claim 1 wherein:
   a. an integrally formed rotatable knob is provided for rotating said cylindrical dispensing drum;
   b. a circular knob guide extends outwardly from the front wall of the canister, and includes a plurality of notches in its outer surface;
   c. a counting ring positioned over said cylindrical drum and sandwiched between the knob and the circular knob guide, said counting ring including a plurality of spring pawls arranged for engagement with said notches for permitting the counting ring to be rotataed only in one direction; and
   d. indicia provided on an outer surface of said counting ring so that as the knob is rotated an observer may be provided with an indication of the number of the times that a measured quantity of material has been dispensed by the dispensing drum.

7. A measuring dispenser as defined in claim 6 wherein the position of each of the indicators on the counting ring is related to the position of the spring pawls and a marker on the canister such that each indicator on the counting ring is positioned under the marker at the instant that one of the spring pawls is moved into engagement with one of said notches so that an audible click will be heard when one of the indicators is positioned under the marker.

8. A measuring dispenser as defined in claim 1 wherein said dipenser further includes:
   a. an agitator for loosening the material in the canister as the dispensing drum is rotated including an agitator member which is connected to a side of the bottom wall means, extends across the enlarged opening provided in the bottom wall means of the canister, includes a finger which extends downwardly so that it may be actuated by the dispensing drum, and a free end portion which is arranged for contact with the other side of the bottom wall means of the canister.

9. A measuring dispenser as defined in claim 8 wherein said agitator further includes:
   a. a rake-shaped member having a plurality of tines connected to the free end portion of the agitator so that the ends of the tines are arranged for contact with the other side of the bottom wall of the canister.

10. A measuring dispenser as defined in claim 8 wherein said dispenser further includes a slot integrally formed in a side of the bottom wall of the canister for receiving an end portion of the agitator in order to readily connect the agitator to the bottom wall of the canister.

11. A measuring dispenser as defined in claim 1 wherein said measuring dispenser further includes:
   a. a plurality of spring fingers integrally formed in the cylindrical wall of said dispensing drum arranged for cooperation with a downwardly extending tab that is provided in the bottom wall of the canister in order to permit rotation of the drum in only one direction.

12. A measuring dispenser comprising:

a. a canister having a front wall, a rear wall and bottom wall means;
b. a front guide positioned at said bottom wall means;
c. a rear guide positioned at said bottom wall means;
d. an enlarged opening provided in the bottom wall means of said canister between the front and rear guides;
e. a rotatable dispensing drum having a transverse wall formed with an enclosing side wall, said dispensing drum being positioned for rotational movement within said front and rear guides;
f. an enlarged dispensing aperture formed in the enclosing side wall of said drum for cooperation with the enlarged opening formed in said bottom wall means;
g. a slot provided in the transverse wall of said dispensing drum;
h. a partition for separating said drum into variable measuring chambers, the partition including a generally longitudinal plate having a width slightly less than the inside of said drum and a transverse wall formed at one end of said partition arranged generally perpendicular to said longitudinal plate and haivng a diameter slightly less than the inside of said drum, said partition being inserted within said drum with the longitudn al plate extending through the slot in the transverse wall of the drum and the transverse partition wall being positioned within the other end of said drum whereby variable measuring chambers are formed between the transverse wall of the drum and the transverse partition wall, said longitudinal plate extending a substantial distance longitudinally outside of said measuring chambers and being provided with a pair of tabs at its outer end portion; and
i. a hollow adjuster having an enclosing wall positioned over the outer end portion of said longitudinal plate and being provided with inclined slots extending through said enclosing wall, the tabs of said plate extending into said inclined slots for moving the transverse partition wall toward and away from the transverse wall of the dispensing drum whereby to vary the volume of the measuring chambers that are provided between the transverse walls.

13. A measuring dispenser comprising:
a. a canister having bottom wall means;
b. a dispensing opening provided in the bottom wall means of the canister;
c. a dispensing drum having a dispensing chamber formed therein positioned in said canister adjacent to the opening formed in the bottom wall means of the canister, said dispensing drum being mounted for rotation, and said dispensing drum including a generally curved outer wall having a plurality of inwardly extending gaps; and
d. an agitator for loosening the material in the canister as the dispensing drum is rotated including an agitator member which is connected to a side of the bottom wall means of the canister, extends across the opening that is provided in the bottom wall means of the canister, includes a finger which extends downwardly for engagement with the generally curved surface of the dispensing drum where it may be acutated by the curved surface of the drum and the gaps that are formed therein, and includes a free end portion which is arranged for contact with the other side of the bottom wall means of the canister.

14. A measuring dispenser comprising:
a. a canister having a front wall, a rear wall and bottom wall means;
b. a front guide having a curved opening positioned at said bottom wall means;
c. a rear guide having a curved opening positioned at said bottom wall means in line with the curved opening formed in the front guide;
d. an enlarged opening provided in the bottom wall means of said canister between the front and rear guides;
e. a generally cylindrical dispensing drum having a front portion provided with a transverse wall, a rear portion, and a generally cylindrical side wall, said dispensing drum being positioned for rotational movement within said front and rear guides;
f. an enlarged dispensing aperture formed in the cylindrical wall of said drum;
g. a slot provided in the front transverse wall of said dispensing drum;
h. a partition for separating said drum into variable measuring chambers, the partition including a generally forwardly extending longitudinal plate having a width slightly less than the inside diameter of said generally cylindrical drum and a transverse wall formed at a rear portion of said partition arranged generally perpendicular to said longitudinal plate and having a diameter slightly less than the inside diameter of said drum, said partition being inserted within said drum with the longitudinal plate extending through the slot in the front transverse wall of the drum and the rear transverse partition wall being positioned within the rear portion of said drum whereby variable measuring chambers are formed between the front transverse wall of the drum and the rear transverse partition wall; and
i. means for moving the forwardly extending longitudinal plate for moving the rear transverse partition wall toward and away from the front transverse wall of the dispensing drum whereby to vary the volume of the measuring chambers that are provided between the transverse walls.

* * * * *